(12) United States Patent
Li

(10) Patent No.: US 7,657,704 B2
(45) Date of Patent: Feb. 2, 2010

(54) METHOD AND RELATED APPARATUS FOR VERIFYING ARRAY OF DISKS

(75) Inventor: Yong Li, Taipei Hsien (TW)

(73) Assignee: Via Technologies Inc., Hsin-Tien, Taipei Hsien (TW)

( * ) Notice: Subject to any disclaimer, the term of this patent is extended or adjusted under 35 U.S.C. 154(b) by 860 days.

(21) Appl. No.: 11/161,301

(22) Filed: Jul. 29, 2005

(65) Prior Publication Data

US 2006/0036905 A1    Feb. 16, 2006

(30) Foreign Application Priority Data

Aug. 10, 2004   (TW)   ............................... 93123970 A

(51) Int. Cl.
  *G06F 12/10*   (2006.01)
(52) U.S. Cl. ................ 711/114; 711/137; 711/168; 714/42
(58) Field of Classification Search ................ 711/114, 711/137, 168; 714/42
  See application file for complete search history.

(56) References Cited

U.S. PATENT DOCUMENTS

2002/0156971 A1*  10/2002  Jones et al. ................ 711/114
2005/0289301 A1*  12/2005  Woo et al. ................... 711/137

* cited by examiner

*Primary Examiner*—Sanjiv Shah
*Assistant Examiner*—Jae U Yu
(74) *Attorney, Agent, or Firm*—Winston Hsu

(57) ABSTRACT

When receiving a verification command for verifying a part of the disk array, each of the disks of the disk array are simultaneously verified such that a part of the disk array practically verified is larger than the part assigned to be verified in the verification command, and verification results are recorded. When receiving the next verification command for verifying another part of the disk array, if the part to be verified is already verified, then the recorded verification result is directly returned in response to the present verification command, thus an efficiency of verifying disk arrays can be raised.

12 Claims, 7 Drawing Sheets

METHOD AND RELATED APPARATUS FOR VERIFYING ARRAY OF DISKS

BACKGROUND OF INVENTION

1. Field of the Invention

The present invention relates to a method and related apparatus for verifying a disk array, and more particularly, to a method and related apparatus for verifying a disk array according to verification commands instead of data configuration of the disk array.

2. Description of the Prior Art

Computer systems are indispensable to the information society. With computer systems, it is convenient for users to calculate, access, and manage a large amount of information, data, and audio/video at high speed. Therefore, information technology manufacturers have been devoted to improving the performance of computer systems to manage data more securely and speedily.

A hard disk is one type of non-volatile storage device and is popularly used in a computer system. With the falling costs and increasing capacities of hard disks, the current computer system is capable of integrating a plurality of hard disks into a disk array for accessing data. For instance, a redundant array of inexpensive disks (RAID) system has different data configurations, such as RAID 0, and RAID 2 to RAID 5. When performing a writing control to write data into the disk array, the data is striped into a plurality of sub-data (i.e. data stripes) in a stripe-like manner, and then each sub-data is respectively written to different disks of the disk array. Similarly, while reading this data from the disk array, each sub-data is simultaneously read from different disks of the disk array and combined to obtain the original data again. Additionally, disk array data configurations includes SPAN/JBOD (just a bunch of disks) configuration. In this configuration, storage space of each disk is connected one by one. In other words, data is stored in the first hard disk first. If the first hard disk has no storage space to store data, data will be stored in the second hard disk. In this manner, disks of SPAN/JBOD configuration are "sequentially" connected to form a larger storage space. That is, storage space of the first hard disk is regarded as the first part of the entire storage space, and storage space of the second hard disk is regarded as the second part of the entire storage space.

As known in the art, the hard disk/disk array should be verified to ensure that data can be correctly accessed in the hard disk/disk array. Generally, when the hard disk/disk array is formatted or a disk scan is performed, the hard disk/disk array is verified to ensure each part of the hard disk/disk array can store and access data correctly. Verifying the hard disk usually takes a quite amount of time. Due to many hard disks being in the disk array, verifying all hard disks of the disk array takes more time. However, verifying a disk array is necessary for ensuring data security and integrity. Therefore, how to increase the verification efficiency of a disk array is an important issue for information technology manufacturers.

In the prior art, the verification is executed according to data configuration of the disk array. For instance, a striped RAID is composed of N hard disks. Data stored in such a striped RAID is separated into N parts, each part including 1/N information of the data and respectively stored in different hard disks of the disk array. When verifying M sectors (or bytes) of the disk array, the prior art respectively verifies M/N sectors of each hard disk in the disk array composed of N hard disks. According to RAID data configuration, integrating M/N sectors of each hard disk that are already verified is equivalent to verifying M sectors in the disk array. After M sectors of the disk array are verified, the disk array continues verifying another M sectors until the entire storage space of the disk array is verified.

However, there are some drawbacks in verifying a disk array according to the prior art. For instance, the prior art has to frequently verify each hard disk. When a hard disk is being verified, the computer system sends a hard disk verification command, such as a read verification command conforming to advanced technology attachment (ATA), to the disk to indicate which part should be verified and the size of the storage capacity to be verified. Here, the verifying storage capacity specified in a single hard disk verification command has an uplimit, i.e., a maximum storage space. That is, if the maximum storage space to be verified is K sectors, each single hard disk verification command verifies K sectors at most in a hard disk. However, when verifying storage space, storage space to be verified is usually less than the maximum verification storage space allowed in a single hard disk verification command. As mentioned above, when verifying M sectors in the disk array, the prior art uses a hard disk verification command to verify M/N sectors of a hard disk. However, M/N sectors are usually less than K sectors, the maximum verification storage space of a single hard disk verification command. Therefore, the prior art must send more hard disk verification commands to completely verify a hard disk in that storage space to be verified. Each hard disk verification command according to the prior art is less than the maximum verification storage space of a single hard disk verification command. This reduces the computer system performance and the efficiency of verifying a disk array.

Additionally, in SPAN/JBOD data configuration, the first hard disk of the disk array is regarded as the first part of the entire storage space, and the second hard disk of the disk array is taken as the second part of the entire storage space. In this case, after the prior art verifies the first hard disk completely, the second hard disk gets verified. Also, this takes a lot of time to verify the entire disk array, and the required time is equal to a sum of the durations to verify each hard disk.

SUMMARY OF INVENTION

It is therefore a primary objective of the claimed invention to provide a method and related apparatus for improving the efficiency of verifying a disk array to solve the above-mentioned problem. The claimed invention allows disk arrays of different data configurations to be verified with higher efficiency.

The claimed invention can be implemented in a driver of a disk array. When the claimed invention receives a verification command (such as a command sent by a user of a computer system through an operating system) to verify M sectors in the disk array, the claimed invention simultaneously controls each hard disk to verify a maximum verification storage space, such that storage space to be verified in the disk array is equal to Me sectors larger than M sectors. In a preferred embodiment, each hard disk verification command sent to each hard disk indicates to verify the maximum verification storage space. In other words, the claimed invention not only verifies M sectors of the disk array, but also verifies excess storage space at the same time. The claimed invention records the verification result of the excess verified storage space, and returns the verification result of M sectors. While receiving another verification command to verify another part of the disk array, if storage space to be verified in this verification command is already verified, then the recorded verification result is directly returned in response to the present verification command instead of verifying the required part to be verified again.

The claimed invention takes advantage of each hard disk verification command sent to the hard disks to efficiently verify the disk array. For RAID, the claimed invention can reduce the number of verification commands sent to the hard disks, reduce computer system resource consumption, and raise the efficiency of verifying the disk array. For SPAN/JBOD, the claimed invention simultaneously verifies each hard disk of the disk array; that is, when the first hard disk is verified, the second hard disk (and other disks in the disk array) is also verified at the same time. Therefore, the claimed invention can decrease time of verifying the disk array substantially.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
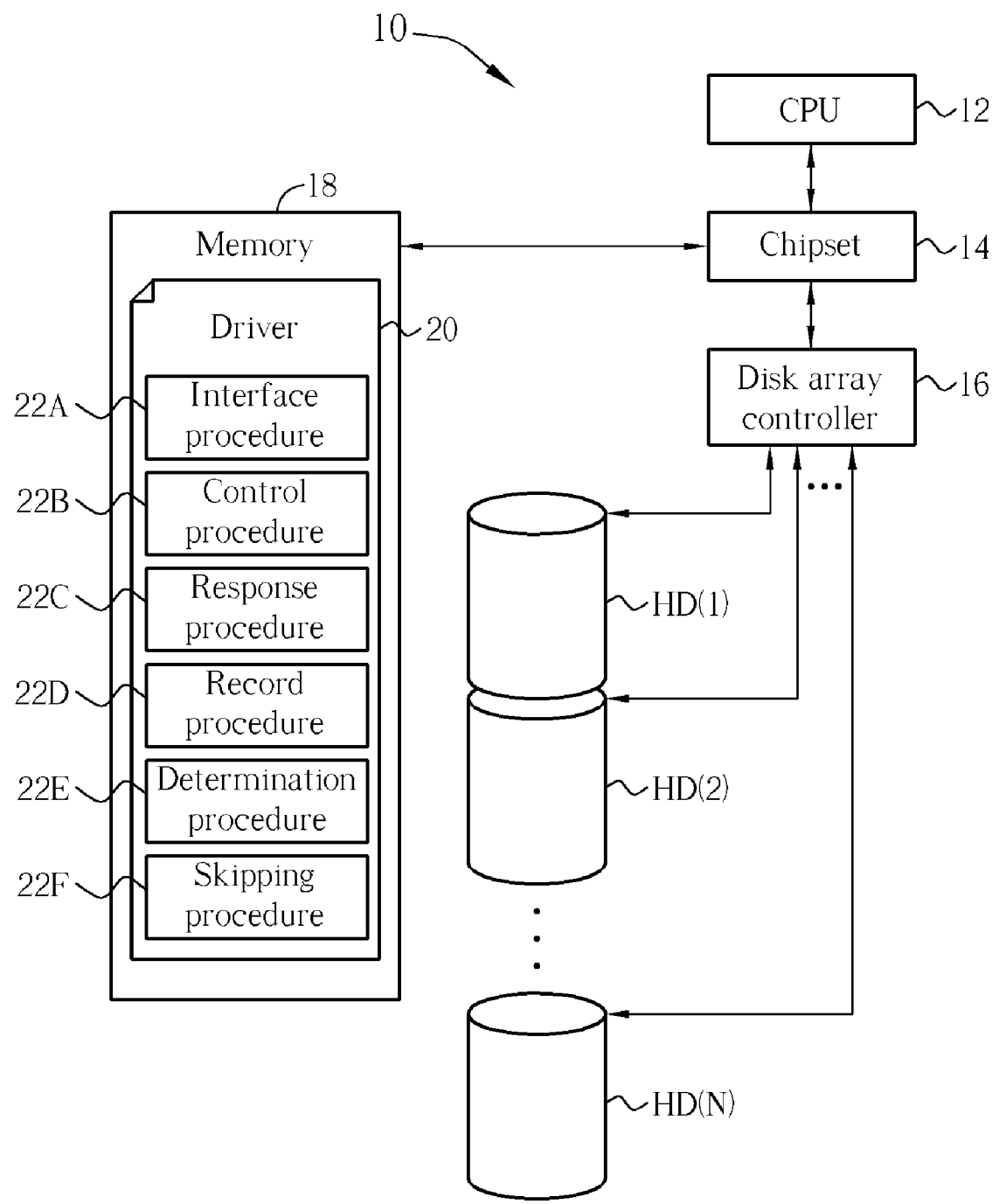
FIG. 1 is a diagram of a computer system according to the present invention.

Please refer to FIG. 1, which is a diagram of a computer system 10 according to the present invention. The computer system 10 comprises a central processing unit (CPU) 12, a chipset 14, a disk array controller 16, a memory 18, and a disk array integrated by a plurality of hard disks HD (1) to HD (N). The CPU 12 controls the operation of the computer system 10 to execute an operating system (OS) and programs, and process data. The memory 18 of the computer system 10 can be a dynamic random access memory (DRAM) to store required information, data or programs when the CPU 12 operates. The chipset 14 is electrically connected to the CPU 12 and the memory 18 to manage data traffic among these components. The disk array controller 16 is electrically connected to each hard disk HD (1) to HD (N) through channels of a bus conforming to intelligent drive electronic (IDE), serial ATA, or small computer system interface (SCSI), such that these hard disks are combined into a disk array, and storage space provided by each hard disk is integrated into the entire storage space of the disk array by the disk array controller 16. In addition, the disk array controller 16 can be integrated into the chipset 14. By executing a driver 20, the CPU 12 can access the entire storage space of the disk array through the disk array controller 16.

For instance, when the user of the computer system 10 sends a request to the operating system to store data in the disk array, the operating system enables the CPU 12 to execute the driver 20 in response to the request. The data is properly processed according to data configuration of the disk array and then stored in corresponding hard disks by the disk array controller 16. Suppose that data configuration of the disk array is RAID 5. By executing the driver 20, the data is separated into N parts, a corresponding parity-bit check is calculated, and N parts and the parity-bit check are respectively stored in corresponding hard disk. Next, the disk array controller 16 sends writing commands through each channel, such as writing commands conforming to ATA/ATAPI, to store N parts and the parity-bit check in different hard disks. Similarly, when the user requests to verify the disk array, the operating system (or other verification program) sends different verification commands to the driver 20 to verify different parts of the disk array in sequence until the entire disk array is completely verified.

In order to implement the present invention, the driver 20 includes an interface procedure 22A, a control procedure 22B, a response procedure 22C, a record procedure 22D, a determination procedure 22E, and a skipping procedure 22F. When the operating system sends a verification command to verify a part (like a sector) of the disk array, the driver 20 receives the verification command from the operating system by executing the interface procedure 22A, and then the disk array controller 16 sends hard disk verification commands (such as read verification commands conforming to ATA/ATAPI) to each hard disk HD(1) to HD(N) by executing the control procedure 22B. In the present invention, the control procedure 22B can take advantage of each hard disk verification command so that a part of the disk array practically verified is larger than the part assigned to be verified in the verification command. In other words, the present invention not only verifies the part (first part) requested by the operating system, but also verifies other parts in the disk array. The response procedure 22C returns the verification result to the operating system, and the record procedure 22D records the verification result of the excess verified parts in the memory 18. When the operating system sends another verification command to verify another part (second part), the driver 20 detects whether the second part is already verified through the determination procedure 22E. If verified, the skipping procedure 22F is executed so that hard disk verification commands are not sent to hard disks, and the response procedure 22C is executed to directly return the recorded verification result to the operating system in response to the present verification command. In this way, the efficiency of verifying the disk array is raised.

Figure 2:
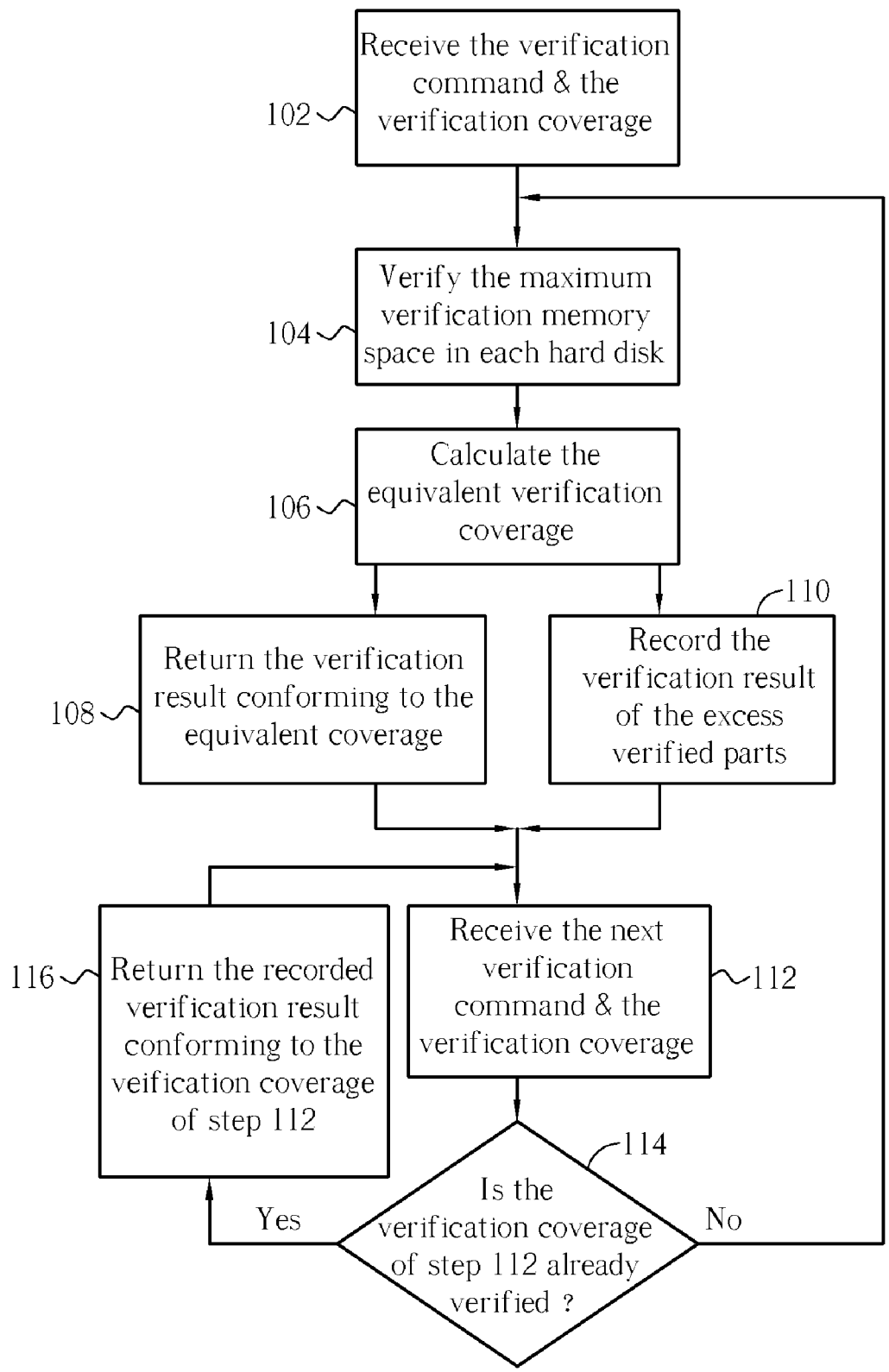
FIG. 2 is a flowchart of when the computer system verifies a disk array.

Please refer to FIG. 2 to shed light on the process of verifying a disk array based on the present invention. FIG. 2 is a flowchart of when the computer system 10 verifies the disk array. The steps are as follows:

Step 102: The driver 20 receives a verification command from the operating system. As mentioned above, when verifying a disk array, the operating system sends different verification commands in sequence to the driver 20. Each verification command requests the driver 20 to verify different parts of the disk array until the entire storage space of the disk array is completely verified. Therefore, each verification command of the operating system includes a verification coverage to indicate which parts (sectors) of the disk array the driver 20 should verify. The parts requested by the verification command are taken as command verification parts. In step 102, the driver 20 starts receiving a verification command and obtains the verification coverage requested by the verification command.

Step 104: The disk array controller 16 simultaneously sends a hard disk verification command to each hard disk of the disk array to verify hard disks. In the present invention, no matter the data configuration of the disk array and the verification coverage, the present invention will simultaneously verify a maximum verification storage space allowed in a single hard disk verification command in hard disks so that the parts of the disk array verified are larger than the parts assigned to be verified in the verification command. As mentioned above, a single verification command has the maximum storage space to be verified. Therefore, when sending a hard disk verification command to each hard disk, the present invention can request to verify the maximum verification storage space. In other words, the present invention can take full advantage of each hard disk verification command sent to hard disks to verify more storage space.

Step 106: The driver 20 can calculate which parts are already verified according to the result of step 104, and calculate an equivalent verification coverage accordingly. Since the entire storage space of the disk array is integrated by storage space of each hard disk, the verified storage space in step 104 is equivalent to certain parts of the entire storage space, the certain parts representing the equivalent verified parts of the equivalent verification coverage. Since the present invention verifies more storage space in step 104, the verified parts of the equivalent verification coverage are larger than the assigned parts of the verification coverage of step 102. In other words, in addition to the assigned parts to be verified in the verification command, the present invention takes full advantage of hard disk verification commands to verify other parts of the entire storage space.

Step 108: The verified parts of the equivalent verification coverage are larger than command verification parts of the verification coverage. Therefore, the result conforming to the verification coverage is returned to the operating system in response to the verification command in step 102.

Step 110: The verification result of excess verified parts is recorded.

Step 112: After step 108 and 110, the driver 20 can receive the next verification command from the operating system. The next verification command indicates another verification coverage.

Step 114: The driver 20 detects whether the verification coverage received in step 112 is already verified in the former equivalent verification coverage. The present invention verifies excess storage space of the entire storage space in step 104. The excess verified parts might include the verification coverage of step 112. If the verification coverage of step 112 is already verified, step 116 is entered. If it is not verified, step 104 is returned to.

Step 116: If the verification coverage of step 112 is already verified, the present invention will not send hard disk verification commands to each hard disk. Instead, the verification result recorded in step 110 is directly returned to the operating system in response to the verification command sent in step 112, and step 112 is again performed to get another verification command.

In order to explain the flowchart of FIG. 2 more clearly, different embodiments implemented in RAID and SPAN/JBOD are described as follows. Please refer to FIG. 3 and FIG. 4, which are diagrams of when the computer system 10 verifies hard disks of a RAID.

Figure 3:
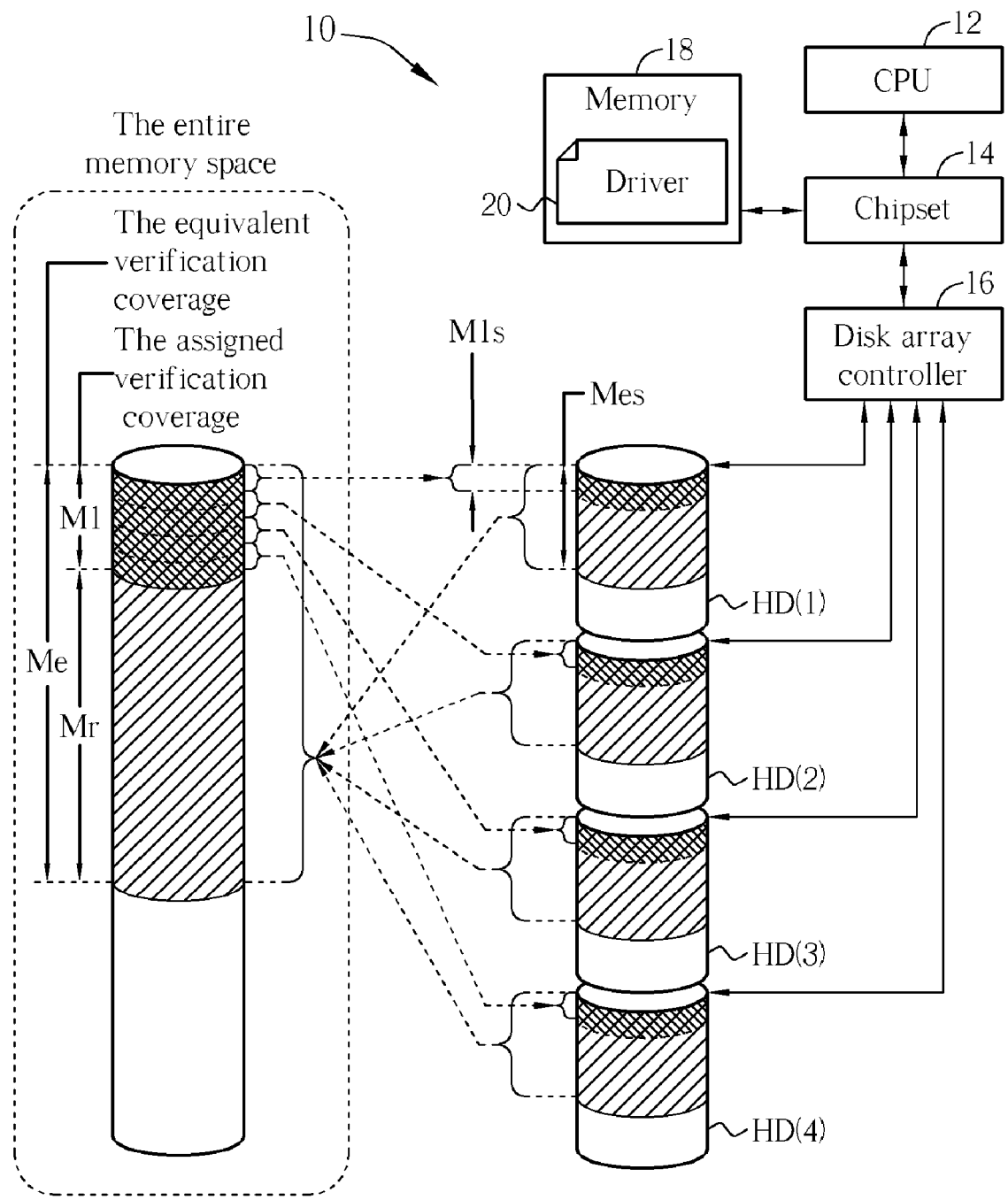
FIG. 3 and FIG. 4 are diagrams of when the computer system verifies hard disks of a RAID.
Figure 4:
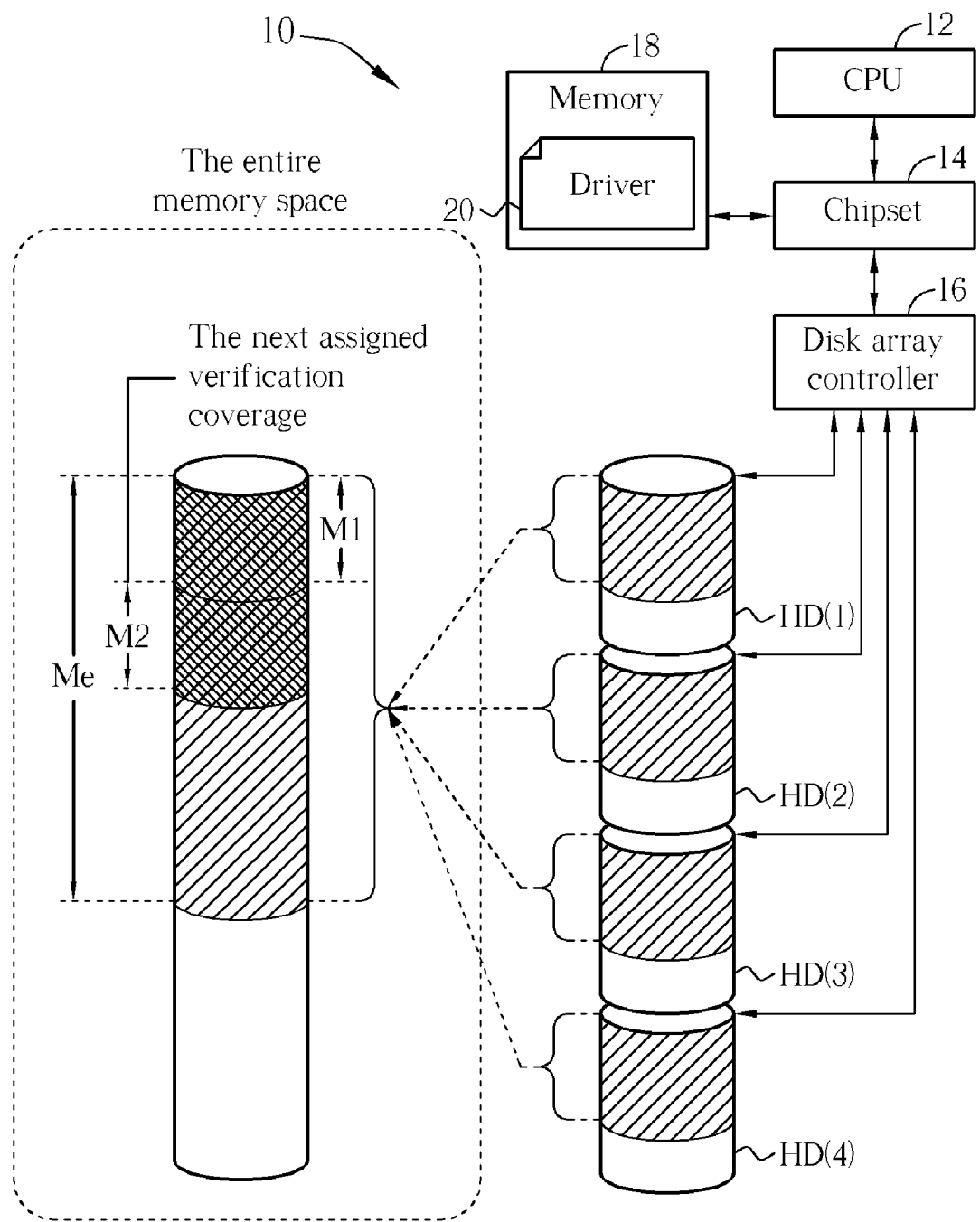

Regarding FIG. 3 and FIG. 4, suppose that the computer system 10 uses four hard disks HD(1) to HD(4) to integrate a RAID5; that is, storage space of each hard disk is combined to the entire storage space of the disk array. In FIG. 3, suppose that the operating system sends a verification command to the driver 20 to verify an M1 part of the entire storage space. In other words, the M1 part is the verification coverage requested by the verification command. The driver 20 executes a procedure corresponding to the flowchart of FIG. 2 from step 102. In RAID data configuration, storage space of the M1 part is composed of M1s parts of hard disks HD(1) to HD(4). The prior art respectively sends a hard disk verification command to each hard disk HD(1) to HD(4) to only verify each M1s part. However, in step 104 of FIG. 2, the present invention takes full advantage of each hard disk verification command sent to each hard disk HD(1) to HD(4) to verify more storage space, Mes parts shown in FIG. 3. The combination of Mes parts verified in each hard disk HD(1) to HD(4) corresponds to the Me part of the entire storage space, the Me part being the equivalent verification coverage. As mentioned above, the present invention not only verifies the M1 part of the verification coverage, but also verifies an additional Mr part.

According to the flowchart of FIG. 2, the verification result of the M1 part can be returned to the operating system (as in step 108), and the verification result of the Mr part is recorded (as in step 110). The verification command detects whether the disk array has defects and records addresses of such defects.

Please refer to FIG. 4, which illustrates receiving another verification command after the state shown in FIG. 3. In FIG. 4, suppose that the driver 20 receives the next verification command (as in step 112). The next verification command indicates to verify an M2 part of the entire storage space. However, the M2 part is included in the excess verified part, the Mr part. The present invention directly enters step 116 of FIG. 2 to return the verification result of the M2 part to the operating system (as step 116), and does not send hard disk verification commands to each hard disk in the present verification command.

If the verification coverage received by the driver 20 is already verified or included in the Me part (the equivalent verification coverage), the present invention executes the skipping procedure (as the loop of steps 112, 114, and 116) until the new verification coverage to be verified is not included in the Me part. Then, step 104 is returned to.

As discussed above, the present invention can reduce the number of hard disk verification commands sent to each hard disk in a RAID so as to raise the efficiency of verifying disk array and the performance of the computer system.

Figure 5:
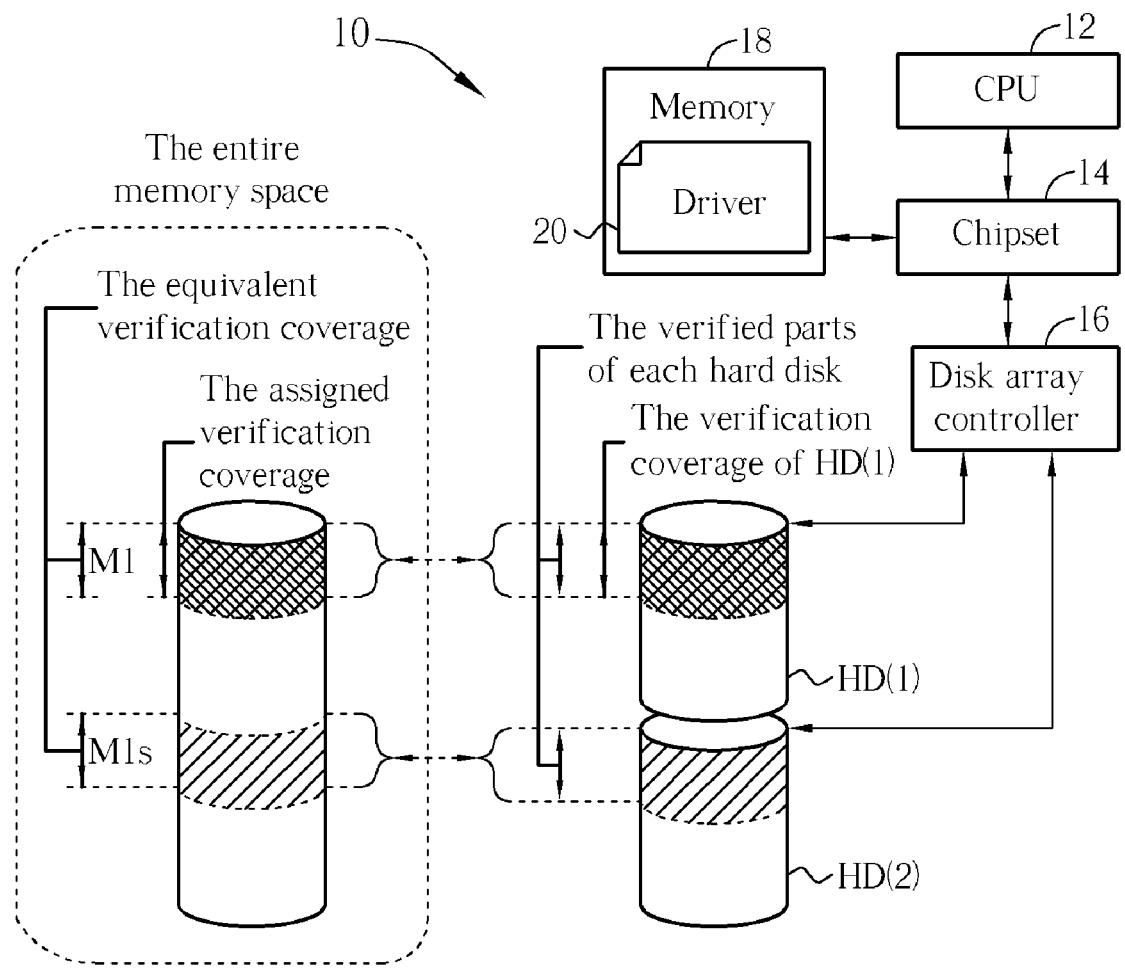
FIG. 5 to FIG. 7 are diagrams when the computer system verifies hard disks of a SPAN/JBOD.
Figure 6:
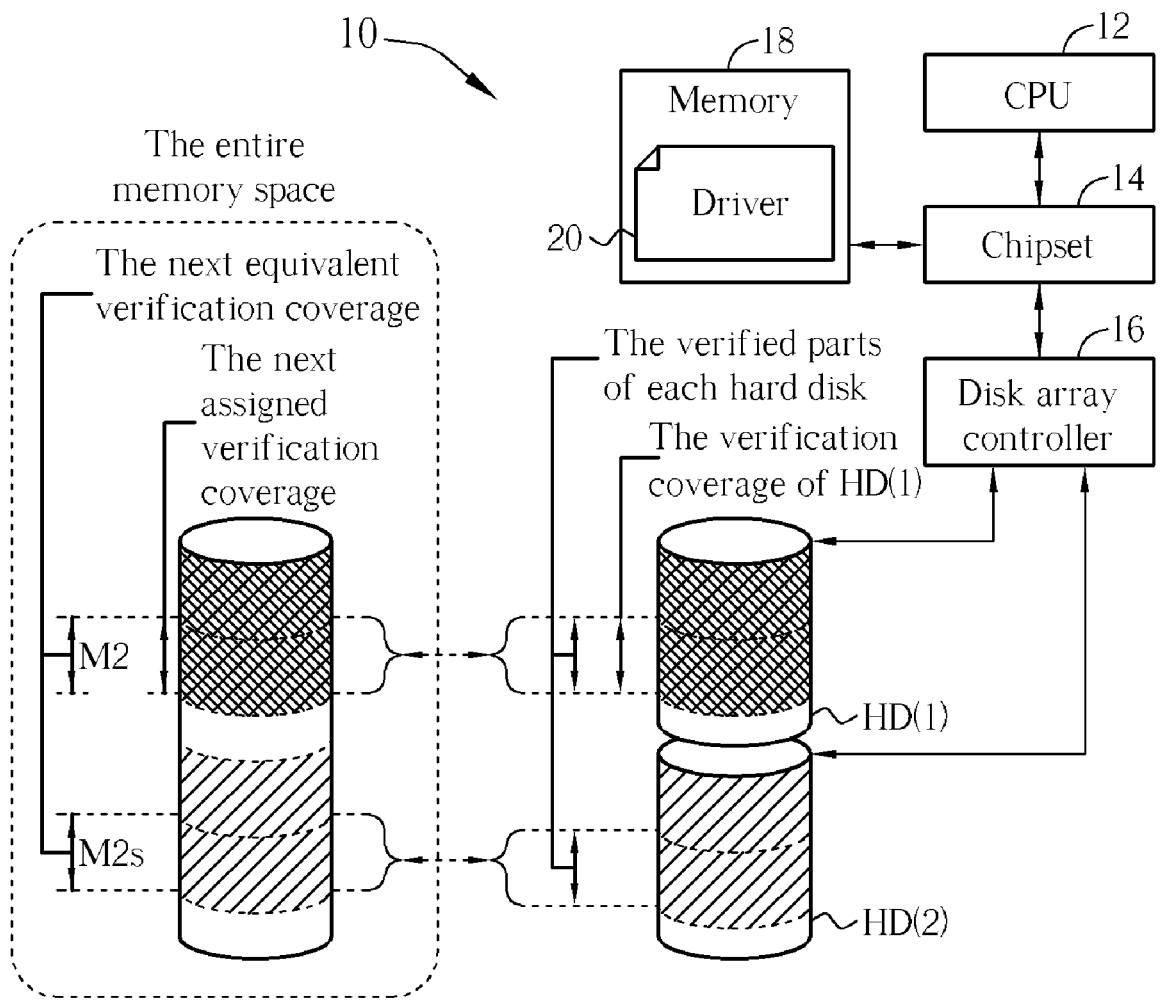
Figure 7:
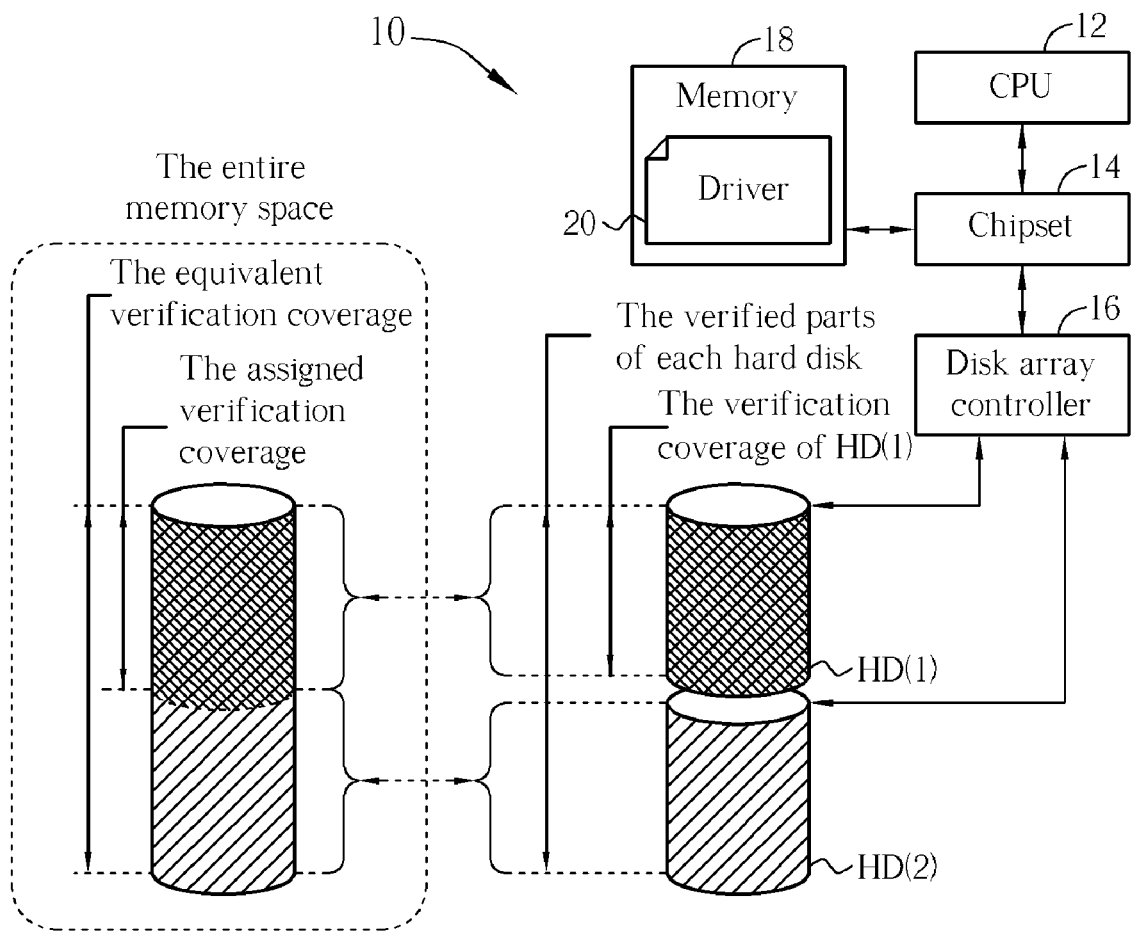

Please refer to FIG. 5 to FIG. 7, which are diagrams of when the computer system 10 verifies hard disks of SPAN/JBOD. Suppose that the computer system 10 uses two hard disks HD(1) and HD(2) having the same memory capacity to integrate a SPAN/JBOD. Storage space of the hard disk HD(1) is the former part of the entire storage space while storage space of the hard disk HD(2) is the latter part of the entire storage space. As shown in FIG. 5, suppose that the driver 20 receives a verification command to verify the M1 part of the entire storage space. The driver 20 starts a process corresponding to the flowchart of FIG. 2, and simultaneously sends hard disk verification commands to hard disks HD(1) and HD(2) in step 104, such that all hard disks of the disk array are being verified. According to data configuration of SPAN/JBOD, the prior art only verifies the M1 part of the hard disk HD(1). However, the disk array controller 16 simultaneously sends hard disk verification commands to each hard disk through channels. Thus, the present invention not only verifies the hard disk HD(1) but also the hard disk HD(2) at the same time (as in step 104). As shown in FIG. 5, the M1 part of the hard disk HD(1) and the M1s part of the hard disk HD(2) are verified at the same time. The M1s part is the excess verified part and the verification result of such is recorded in step 110.

Please refer to FIG. 6, which shows receiving another verification command after the state shown in FIG. 5. In FIG. 6, suppose that the driver 20 receives the next verification command (as in step 112). The next verification command indicates to verify the M2 part of the entire storage space. The driver 20 sends hard disk verification commands to verify the hard disks HD(1) and HD(2) again in step 104. In this way, the M2 part of the hard disk HD(1) is verified according to the next verification command, and the M2s part of the hard disk HD(2) is also additionally verified. The M2s part is another part of the latter part of the entire storage space. The verification result of the M2s part is also recorded in step 110. The prior art only verifies the M2 part of the hard disk HD(1) according to data configuration of SPAN/JBOD.

The driver 20 continues receiving verification commands from the operating system to verify the hard disks HD(1) and HD(2) until the former part of the entire storage space (storage space provided by the hard disk HD(1)) is completely verified. Since the present invention verifies the two hard disks HD(1) and HD(2) at the same time, the latter part of the entire storage space provided by the hard disk HD(2) is also completely verified. As shown in FIG. 7, the verified parts in the hard disk HD(2) are the excess verified parts according to the present invention. When the operating system sends a verification command to verify the latter part of the entire storage space, the driver 20 runs the loop of step 112 to 116 in that the latter part of the entire storage space is included in the excess verified parts. The driver 20 does not have to verify the latter part of the entire memory again. Instead, the driver 20 only returns the recorded verification result to the operating system in response to all verification commands sent by the operating system.

Suppose that a SPAN/JBOD is composed of N hard disks HD(1) to HD(N) having the same memory capacity. Only when the operating system requests to verify the former 1/N parts of the entire storage space, does the present invention send hard disk verification commands to each hard disk. When the operating system requests to verify the remaining ((N−1)/N) parts of the entire storage space, the driver of the present invention returns the recorded verification result instead of sending hard disk verification commands for verifying hard disks since the ((N−1)/N) parts are already verified.

When verifying hard disks, no data is accessed. Thus, the present invention can take full advantage of each hard disk verification command sent to hard disks to verify excess parts, and is not limited by data configuration of the disk array. Compared to the prior art, the present invention can raise the efficiency of verifying hard disks for RAID and SPAN/JBOD systems to ensure data security. In addition to using the driver to implement the present invention, some procedures of the driver can be hardware, firmware codes, or programmable circuits implemented in the disk array controller to achieve the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for verifying an array of disks, each of the disks providing a storage space to form an entire storage space, the method comprising:
    assigning storage space of each of the disks to a part of the entire storage space of the disk array;
    receiving a first verification command for indicating a first verification coverage, the first verification coverage representing parts of disks to be verified according to the first verification command; and
    after receiving the first verification command, sending a hard disk verification command to each of all the disks to verify an assigned part of each of the disks simultaneously, and calculating a first equivalent verification coverage of the entire storage space according to the assigned parts, wherein the first equivalent verification coverage is larger than the first verification coverage, wherein the hard disk verification command is performed without accessing data stored in the disks of the disk array.

2. The method of claim 1 further comprising:
    after verifying each disk, returning a first verification result conforming to the first verification coverage.

3. The method of claim 1 further comprising:
    after verifying each disk, recording a verification result of an excess verified part different from the first verification coverage.

4. The method of claim 3 further comprising:
    receiving a second verification command for indicating a second verification coverage, the second verification coverage representing parts of disks to be verified according to the second verification command;
    determining whether the second verification coverage is included in the first equivalent verification coverage; and
    if the second verification coverage is included in the first equivalent verification coverage, returning a second verification result conforming to the second verification coverage.

5. The method of claim 4 further comprising:
    if the second verification coverage is included in the first equivalent verification coverage, returning the second verification result without verifying disks.

6. A computer system comprising:
    a disk array having a plurality of disks, each of the disks providing a storage space to form an entire storage space, storage space of each of the disks corresponding to a part of the entire storage space of the disk array;
    a central processing unit; and
    a memory for storing programs and data, the memory storing:
    an interface procedure for receiving a verification command indicating a first verification coverage, the first verification coverage representing parts of the disks to be verified according to the first verification command; and
    a control procedure for sending a hard disk verification command to each of all the disks to verify an assigned part of each of the disks simultaneously after receiving the verification command, and calculating a first equivalent verification coverage of the entire storage space according to the assigned parts, wherein the first equivalent verification coverage is larger than the first verification coverage, wherein the hard disk verification command is performed without accessing data stored in the disks of the disk array.

7. The computer system of claim 6 wherein the memory further stores:
    a response procedure for returning a verification result conforming to the first verification coverage after verifying each disk.

8. The computer system of claim 6 wherein the memory further stores:
    a record procedure for returning a verification result of an excess verified part different from the first verification coverage after verifying each disk.

9. The computer system of claim 8 wherein when the interface procedure receives a next verification command indicating a second verification coverage, the second verification coverage representing parts to be verified according to the next verification command, and the memory further stores:

a determination procedure for determining whether the second verification coverage is included in the first equivalent verification coverage, if the second verification coverage is included in the first equivalent verification coverage, the record procedure is executed to return a second verification result conforming to the second verification coverage.

10. The computer system of claim 9 wherein the memory further stores:

a skipping procedure for stopping verifying disks, if the second verification coverage is included in the first equivalent verification coverage, the skipping procedure is executed to stop verifying disks and then the response procedure is executed to return the second verification result conforming to the second verification coverage.

11. The method of claim 1, wherein the first equivalent verification coverage is equal to a sum total of a maximum verification storage space for each of the disks in the disk array as specified in a single hard disk verification command given to each of the disks in the disk array.

12. The computer system of claim 6, wherein the first equivalent verification coverage is equal to a sum total of a maximum verification storage space for each of the disks in the disk array as specified in a single hard disk verification command given to each of the disks in the disk array.

* * * * *